US012798304B2

(12) United States Patent

Jonasson et al.

(10) Patent No.: US 12,798,304 B2
(45) Date of Patent: Nov. 17, 2026

(54) WHEEL-SPEED BASED TYRE EXPLOSION DETECTION

(71) Applicant: VOLVO TRUCK CORPORATION, Gothenburg (SE)

(72) Inventors: Mats Jonasson, Partille (SE); Jan-Inge Svensson, Gothenburg (SE); Dandan Ge, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/152,172

(22) PCT Filed: Jan. 31, 2023

(86) PCT No.: PCT/EP2023/052363
§ 371 (c)(1),
(2) Date: Jul. 30, 2025

(87) PCT Pub. No.: WO2024/160364
PCT Pub. Date: Aug. 8, 2024

(65) Prior Publication Data
US 2026/0225412 A1 Aug. 6, 2026

(51) Int. Cl.
*B60C 23/06* (2006.01)
*B60W 40/12* (2012.01)

(52) U.S. Cl.
CPC ........... *B60C 23/061* (2013.01); *B60W 40/12* (2013.01)

(58) Field of Classification Search
CPC ............................ B60C 23/061; B60W 40/12
See application file for complete search history.

(56) References Cited

U.S. PATENT DOCUMENTS

| | | | |
|---|---|---|---|
| 5,760,682 A | 6/1998 | Liu et al. | |
| 2002/0179345 A1 | 12/2002 | Bell | |
| 2004/0015312 A1 | 1/2004 | Asano et al. | |

(Continued)

FOREIGN PATENT DOCUMENTS

| | | |
|---|---|---|
| CN | 108973545 A | 12/2018 |
| CN | 109606034 A | 4/2019 |

(Continued)

OTHER PUBLICATIONS

International Search Report and Written Opinion of the International Searching Authority in corresponding International Application No. PCT/EP2023/052363 mailed Jul. 21, 2023 (13 pages).

*Primary Examiner* — Long T Tran
*Assistant Examiner* — Charles J Brauch
(74) *Attorney, Agent, or Firm* — Jeffri A. Kaminski; Venable LLP

(57) ABSTRACT

A computer system detects tyre explosion in a heavy-duty vehicle. The computer system has processing circuitry to obtain wheel rotation data indicative of a first wheel rotary motion and of a second wheel rotary motion, for first and second wheels of an axle on the vehicle, determine a difference in rotary motion between the first wheel rotary motion and the second wheel rotary motion, compensate the difference in rotary motion for a deviation in motion by the vehicle from a straight path, and detect tyre explosion in case the compensated difference in rotary motion does not satisfy a predetermined acceptance criterion.

20 Claims, 4 Drawing Sheets

(56) References Cited

U.S. PATENT DOCUMENTS

| | | | |
|---|---|---|---|
| 2010/0013617 | A1 | 1/2010 | Fujita et al. |
| 2011/0029214 | A1 | 2/2011 | Fu |
| 2015/0346047 | A1 | 12/2015 | Wada |
| 2018/0162411 | A1 | 6/2018 | Alvarez Jaime et al. |
| 2019/0258251 | A1 | 8/2019 | Ditty et al. |

FOREIGN PATENT DOCUMENTS

| | | | | | |
|---|---|---|---|---|---|
| CN | 113524989 | A | | 10/2021 | |
| EP | 0712740 | A2 | | 5/1996 | |
| EP | 1086834 | A2 | | 3/2001 | |
| EP | 1659006 | A2 | | 5/2006 | |
| JP | 2003291616 | A | * | 10/2003 | ........... B60C 23/061 |
| WO | 2020001758 | A1 | | 1/2020 | |

* cited by examiner

WHEEL-SPEED BASED TYRE EXPLOSION DETECTION

CROSS-REFERENCE TO RELATED APPLICATIONS

This application is a U.S. National Stage application of PCT/EP2023/052363, filed Jan. 31, 2023 and published on Aug. 8, 2024, as WO 2024/160364, all of which is hereby incorporated by reference in its entirety.

TECHNICAL FIELD

This disclosure relates generally to monitoring and control of heavy-duty vehicles such as trucks, busses, and construction equipment. In particular aspects, the disclosure relates to a computer-implemented tyre explosion detector arranged to automatically detect when tyre explosion occurs, such that mitigating actions by the vehicle can be triggered. Although the disclosure may be described with respect to a particular vehicle, the disclosure is not restricted to any particular vehicle.

BACKGROUND

Tyre explosion is an event where a tyre abruptly ruptures, e.g., due to wear or impact. Tyre explosion may lead to vehicle instability and may cause hazard to both the occupants in the vehicle as well as other nearby road users. It is desired to quickly detect when tyre explosion occurs, such that hazard-mitigating action can be taken.

Tyre pressure monitoring systems (TPMS) are systems arranged to monitor tyre pressure in one or more tyres, often using battery powered tyre pressure sensors arranged inside the tyre and wirelessly connected to a receiver outside the tyre that communicates with a vehicle control system. The TPMS system will trigger generation of a warning signal in case the tyre pressure deviates from a predetermined range of acceptable pressure values. TPMS systems are often capable of detecting tyre explosion successfully. However, some TPMS systems are associated with an unacceptable detection latency, and other TPMS systems have been known to fail in the detection of tyre explosion events, e.g., because the sensor hardware becomes damaged by the forces it is subject to during a tyre explosion.

An improved tyre explosion detection system is desired.

SUMMARY

Techniques for automatic detection of tyre explosions are disclosed herein. The techniques may be described in terms of a computer system and/or as methods performed by the computer system. In particular, computer systems are disclosed herein for detecting tyre explosion in a heavy-duty vehicle. The computer system comprises processing circuitry configured to obtain wheel rotation data indicative of a first wheel rotary motion and of a second wheel rotary motion, for first and second wheels of an axle on the vehicle, or of a plurality of axles on the vehicle. The processing circuitry is configured to determine a difference in rotary motion between the first wheel rotary motion and the second wheel rotary motion, and to compensate the difference in rotary motion for a deviation in motion by the vehicle from a straight path. The processing circuitry is configured to detect tyre explosion in case the compensated difference in rotary motion does not satisfy a predetermined acceptance criterion. This way tyre explosion can be detected with low latency and in a reliable and automated manner. A number of control applications can be based on the tyre explosion detection, to mitigate the consequences of the tyre explosion on, e.g., vehicle stability. Warning signals and notification messages in-between vehicle functional modules can also be triggered in an automated and timely manner, which is an advantage. The tyre explosion detection systems discussed herein can be advantageously combined with TPMS-based tyre explosion systems for increased reliability.

The first wheel rotary motion and the second wheel rotary motion may comprise wheel speed and/or wheel acceleration, which are measurements that can be obtained from wheel speed sensors in a cost-efficient and reliable manner. Wheel speed sensors are normally mounted on heavy-duty vehicles in use today. This is an advantage since many of the techniques and methods discussed herein can be implemented on computer systems of legacy vehicles, as a software update.

The deviation in motion by the vehicle from a straight path may comprise any of yaw motion and yaw motion rate indicative of a vehicle motion curvature. If the vehicle does not travel on a straight path, but along some form of curved track, then a difference in wheel rotary motion of the left and right wheels of an axle is to be expected. Such expected differences in rotary motion should not be taken as an indication of tyre explosion, and it is therefore compensated before prior to detecting tyre explosion.

The axle may be a steered axle on the vehicle, normally a steered front axle, although steered rear axles may also be relevant for tyre explosion detection according to the techniques discussed herein. The deviation in motion by the vehicle from the straight path then preferably comprises a steering angle applied at the steered axle. An applied steered angle indicates that a difference in rotary motion between the two wheels is to be expected. It is an advantage that such expected deviations from motion along a straight track is compensated for.

According to some aspects, the processing circuitry is configured to receive acceleration data from one or more IMUs and/or steering angle data from a steering angle data source, indicative of a deviation in motion by the vehicle from a straight path. The option of obtaining motion data from several independent data sources means that a more reliable tyre explosion detection system can be realized, compared to a system which only uses data from a single source, such as only wheel speed sensor data, only IMU data, or only applied steering angle data.

The processing circuitry is preferably also configured to determine a wheel motion oscillation based on the wheel rotation data, and to detect tyre explosion in case the compensated difference in rotary motion and/or the wheel motion oscillation does not satisfy predetermined acceptance criteria. Accounting for wheel oscillation in addition to other detection criteria gives a more reliable detection in many cases, and sometimes also a faster detection, which is an advantage. The processing circuitry, having access to wheel oscillation information, can also be configured to determine which wheel on the axle that has suffered a tyre explosion based on the wheel motion oscillation of the wheels on the axle. This information can be used when attempting to compensate for the impact on vehicle motion by the tyre explosion.

According to some aspects, the processing circuitry is configured to verify a detected tyre explosion after a time period. It is desired to quickly detect tyre explosion, such that mitigating actions can be triggered without delay. However, the faster the detection is made, the more uncertain it normally is. The systems proposed herein may be configured to detect tyre explosion fast, and then to verify that the fast detection was actually a correct after some delay. This gives a fast detection, and also a reliable confirmation of the detection after some delay.

The processing circuitry can also be configured to compensate the difference in rotary motion for a difference in tyre radius on the left side and the right side on the axle. A difference in tyre radius will give rise to a constant or at least slowly changing difference in rotary motion. This bias in difference can be compensated for by the systems disclosed herein, which is an advantage.

The processing circuitry is preferably configured to adjust vehicle motion in response to detecting a tyre explosion, such as lowering vehicle speed in response to detecting a tyre explosion, and/or adjusting an admissible steering torque of the vehicle in response to detecting a tyre explosion. This way the computer system can mitigate the consequences of the tyre explosion, e.g., by compensating for introduced and undesired yaw motion. The heavy-duty vehicle may also comprise several motion support devices which can be coordinated to achieve motion in different ways. Steering can for instance be achieved using rear brake actuators as well as steered front wheels. The consequences of a tyre explosion on a front wheel of a steered axle can for instance be compensated for by applying a controlled amount of differential braking on the rear axles of the vehicle.

The processing circuitry may also be configured to trigger generation of a warning signal to a driver of the vehicle in response to detecting a tyre explosion, and/or to trigger generation of a notification message to an autonomous drive system of the vehicle in response to detecting a tyre explosion. This type of automated warning and/or notification improves vehicle safety.

The processing circuitry is optionally also configured to activate a corrective steering function and/or an oversteer guidance system of the vehicle in response to detecting a tyre explosion. Hence, there are many ways in which the tyre explosion detector output can be used to mitigate the consequences of the tyre explosion on the motion of the vehicle, which is an advantage.

According to some aspects, the processing circuitry is configured to determine a road surface roughness, and to discard a detected tyre explosion in case the road surface roughness does not satisfy a predetermined roughness acceptance criterion. This makes the system more robust on uneven road surfaces. Heavy-duty vehicles travelling on uneven roads often travel very slowly, where the consequences of tyre explosion are limited.

The different techniques and features of the computer system discussed herein may also be described as corresponding methods, associated with the same advantages. The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer systems, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Figure 1:
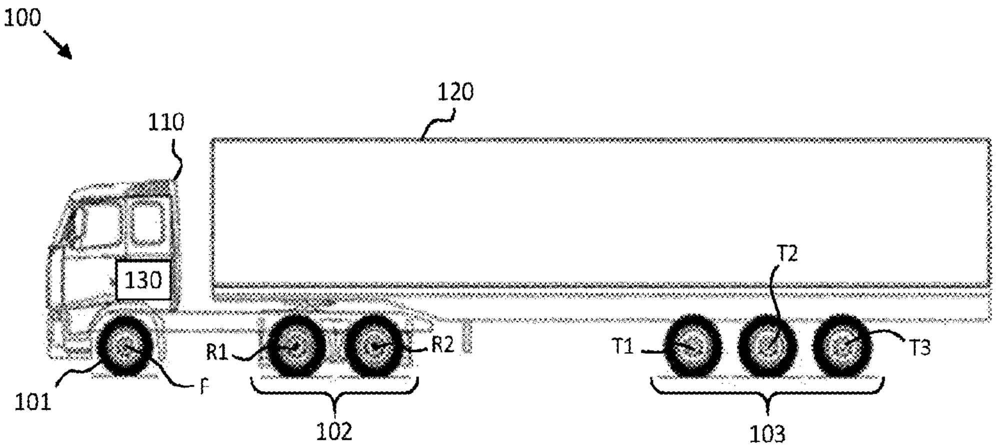
FIG. 1 illustrates an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description. Aspects set forth below represent the necessary information to enable those skilled in the art to practice the disclosure.

FIG. 1 illustrates an example heavy-duty vehicle 100, here in the form of a truck comprising a tractor 110 and a trailer 120. The tractor 110 of the vehicle 100 comprises two front wheels 101 of a steered front axle F, where the left front wheel will be denoted 101L and the right front wheel will be denoted 101R below. The tractor 110 also comprises a set of rear wheels 102 on rear axles R1, R2. The trailer 120 also comprises wheels 103 arranged on axles T1, T2, T3.

The present disclosure is applicable to many different vehicle types comprising steerable front wheels 101, not only articulated vehicles. Rigid trucks and other forms of heavy-duty vehicles are also covered by the teachings herein, as well as passenger cars and recreational vehicles.

The techniques for detecting tyre explosion discussed herein can be applied to any axle or axles on a vehicle, i.e., to a front axle, to a rear axle of a tractor unit 110, and/or to one or more axles of a trailer vehicle unit 120.

The vehicle 100 comprises a computer-implemented control system arranged to control vehicle motion, among other things. This control system may comprise one or more control units 130 distributed over the vehicle or centralized at one place. Each vehicle control unit 130 may comprise one or more processor devices. A processor device may also be distributed over several spatially separated units or centralized in one place. The control system, or parts thereof, may be arranged to communicate via wireless link to a wireless access point, such as a radio base station of a cellular access network or the like. Thus, the vehicle control system may communicate with one or more remote servers, data repositories, and remote processing resources, in order to exchange data and perform various computation tasks. The vehicle control system 130 may be referred to as a system for vehicle motion management (VMM).

Figure 2:
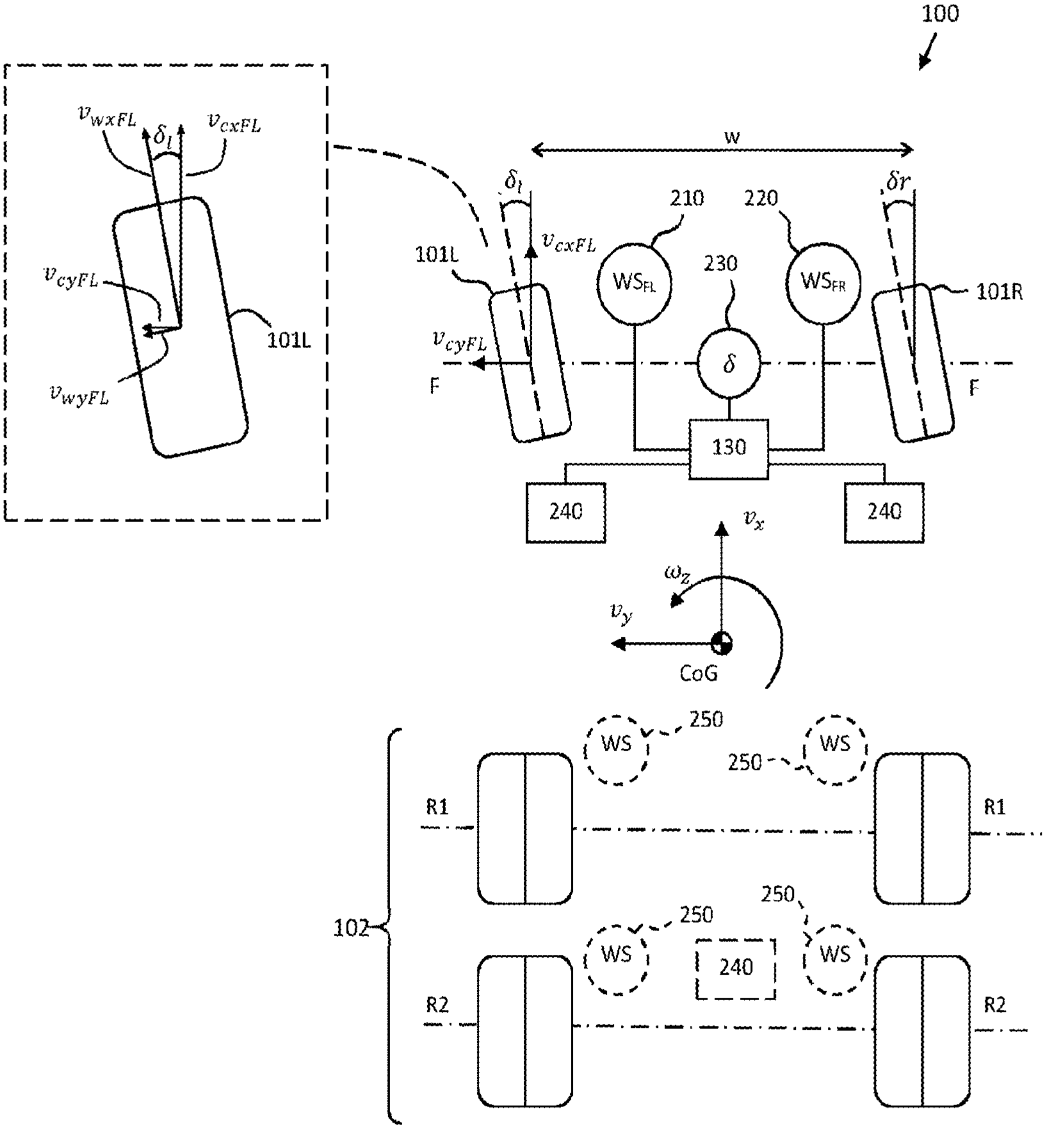
FIG. 2 schematically shows wheels, sensors, and control units on a heavy-duty vehicle, FIGS. 3-4 schematically illustrate aspects of an example vehicle control system.

FIG. 2 schematically illustrates some components of an example heavy-duty vehicle 100. There is a front left wheel 101L and a front right wheel 101R arranged on the steered front axle F of the vehicle. The front axle F is often not a physical axle connecting the two front wheels, but an axis extending transversal to the vehicle longitudinal direction and intersecting the two front wheels 101L, 101R. The steered wheels 101L, 101R have respective steering angles $\delta_l$, $\delta_r$. These two angles may be assumed equal in most cases of relevance and will then be jointly denoted by $\delta$. The front trackwidth of the vehicle 100 is denoted w. Each wheel 101L, 101R is associated with a wheel speed sensor $WS_{FL}$ 210 and $WS_{FR}$ 220. A wheel speed sensor may, e.g., comprise a Hall effect sensor or rotary encoder which measures the rotary motion of a wheel. There are also first and second rear axles R1, R2, with wheels 102.

The index of a general rotation w of an object such as a wheel or a vehicle unit will be used herein to indicate which object the rotation refers to and about which axis. A wheel speed of the i-th wheel on the vehicle about its wheel axle will be denoted $\omega_i$ and its acceleration about the wheel axle $\dot{\omega}_i$, where i may, e.g., be FL for the front left wheel. A rotation of the vehicle 100 about an axis will be indicated by using the axis as subscript, i.e., $\omega_x$, $\omega_y$, $\omega_z$ for rotation about axes x, y, and z. The x-axis extends in the longitudinal direction of the vehicle 100, the y-axis is lateral to the vehicle forward direction, and the z-axis is normal to the extension plane of the vehicle chassis. The meaning of a given rotation variable $\omega$ will be clear from context.

A wheel speed sensor may be used to determine a wheel speed $\omega_i$ of a wheel and/or a wheel acceleration $\dot{\omega}_i$, where $\dot{x}$ is generally used herein to denote the time derivative of x. Wheel speed sensors are generally known and will therefore not be discussed in more detail herein.

There is also a steering angle data source 230 which provides data indicative of the respective steering angles $\delta_l$, $\delta_r$, or the common steering angle $\delta$. The steering angle data source 230 may be a component in a power steering system or an encoder which provides data related to the current steered angle of the wheels 101L, 101R. The steering angle data source 230 may be part of an electronic power steering controller, or a module in the overall VMM system of the vehicle 100.

One or more inertial measurement units (IMU) 240 may be arranged to provide acceleration data. The data provided by the IMU may comprise accelerations in three dimensions, i.e., $[a_x, a_y, a_z]$, and also roll motion, pitch motion, and yaw motion, i.e., $[\omega_x, \omega_y, \omega_z]$, as well as roll rate, pitch rate, and yaw motion rate, i.e., $[\dot{\omega}_x, \dot{\omega}_y, \dot{\omega}_z]$. The location of each IMU on the vehicle frame can be assumed known a-priori, which means that the output signal from a given IMU can be translated into a common reference system, perhaps one centered at the center of gravity (CoG) of the vehicle 100 and aligned with a forward direction of the vehicle 100.

The wheel speed sensors 210, 220, the steering angle data source 230, and the one or more IMUs 240 are connected to the vehicle control unit 130 via wired or wireless link.

The rear wheels 102 of the vehicle 100 may also be associated with respective optional wheel speed sensors 250 which are also connected to the control unit 130 (although the connections are not shown in FIG. 2). One or more IMUs 240 may also be arranged in connection the rear axles R1, R2 of the vehicle 100.

The axles and wheels of the trailer vehicle unit 120 is not shown in FIG. 2. It is, however, appreciated, that the techniques discussed herein for tyre explosion detection can also be applied to the wheels 103 and axles T1, T2, T3 of one or more trailer vehicle units and dolly vehicle units.

It is known that a tyre explosion more or less immediately impacts the rotary motion of the wheel where the tyre explosion happened. Wheel rotary motion, such as wheel speed and wheel acceleration can therefore be used to detect when tyre explosion occurs. However, wheel rotary motion also changes significantly during vehicle operation, e.g., as the vehicle accelerates and decelerates. Yaw motion by the vehicle also has an impact on the rotary motion by two wheels on the same axle. However, it has been realized that by monitoring differences in wheel speed for two wheels on the same axle and compensating the difference in rotary motion of the wheels based on current vehicle motion, a robust tyre detection variable can be obtained which can be used for tyre explosion detection. Since difference is monitored and not absolute wheel speed, the method becomes less sensitive for variation in longitudinal velocity by the vehicle. Any cornering by the vehicle is compensated for by the computer system, which means that the detection mechanism is able to cope also with significant yaw rate by the vehicle. To summarize, with reference also to FIG. 6 which will be discussed in more detail below, there is disclosed herein a computer system 130, 600 for detecting tyre explosion in a heavy-duty vehicle 100. The computer system 130, 600 comprises processing circuitry, i.e., one or more control units, configured to obtain wheel rotation data indicative of a first wheel rotary motion $\omega_1$, $\dot{\omega}_1$ and of a second wheel rotary motion $\omega_2$, $\dot{\omega}_2$, for first and second wheels 101L, 101R of an axle F, R1, R2, T1, T2, T3 on the vehicle 100. The first wheel rotary motion $\omega_1$, $\dot{\omega}_1$ and the second wheel rotary motion $\omega_2$, $\dot{\omega}_2$ may, e.g., comprise wheel speeds and/or wheel accelerations obtained from respective wheel speed sensors 210, 220. Wheel speed oscillation is also considered a form of rotary motion herein. One or more axles may be considered in parallel by the computer system, where the steered front axle is often of most interest due to the impact on vehicle stability if a wheel on this axle explodes.

The processing circuitry is also configured to determine a difference $\Delta\omega$, $\Delta\dot{\omega}$ in rotary motion between the first wheel rotary motion $\omega_1$, $\dot{\omega}_1$ and the second wheel rotary motion $\omega_2$, $\dot{\omega}_2$. This difference in rotary motion is indicative of how the first wheel rotates in comparison to the second wheel. In case the vehicle 100 travels along a straight path and on a smooth surface, there should only be a small difference between the two wheel speeds. An increase or a decrease in longitudinal speed by the vehicle will not be a problem since the difference in rotary motion will not be affected. However, if the vehicle is turning, i.e., moving along a path with a curvature, such as if the steering angles $\delta_l$, $\delta_r$ on the front axle F are non-zero, then an expected difference in wheel rotary motion will be present, which should not trigger detection of tyre explosion. The processing circuitry is therefore configured to compensate the difference in rotary motion $\Delta\omega$, $\Delta\dot{\omega}$ for a deviation in motion by the vehicle 100 from a straight path. After compensation, there should not be any significant difference left in the rotary motion of the first and second wheels if all tyres are fully functional and no tyre has exploded. The processing circuitry is configured to detect tyre explosion in case the compensated difference in rotary motion $\Delta\omega$, $\Delta\dot{\omega}$ does not satisfy a predetermined acceptance criterion. The acceptance criteria may, e.g., comprise a threshold against which the compensated difference is compared. More advanced detection criteria can also be formulated, based on statistical analysis of the compensated difference. For instance, the compensated difference can be compared to an expected statistical distribution, and tyre explosion can be detected if the statistical distribution of the monitored compensated difference is no longer found to adhere to the expected statistical distribution. Aspects of time may also be added to the detection criteria. For instance, a filter bank can be implemented which low-pass filters the compensated difference using two or more filter bandwidths, i.e., using two or more levels of averaging. Different thresholds can then be used for each filter in order to obtain a fast preliminary detection and a more reliable but higher latency detection. This filter bank can comprise any number of filters. The processing circuitry is optionally configured to verify a detected tyre explosion after a time period. This verification can, e.g., be based on the output of a low-pass filter or based on some other form of higher latency processing, such as a statistical test as discussed above, or the output from a Kalman filter or the like which is associated with higher latency compared to, e.g., faster threshold-based detectors.

According to some aspects, the processing circuitry is also configured to compensate the difference in rotary motion $\Delta\omega$, $\Delta\dot{\omega}$ for a difference in tyre radius on the left side and the right side on the axle. A difference in tyre radius will give a constant or slowly changing offset in rotary motion over the axle. The effects of tyre radius can be compensated for by high pass filtering the difference signal to remove "DC components", i.e., constant differences which do not change fast over time. The constant difference in rotary motion can also be estimated, e.g., from low pass filtering the difference in rotary motion and then removing this difference during tyre explosion monitoring. A calibration error in, e.g., a wheel speed sensor, may also give a constant offset in measured rotary motion between the left wheel and the right wheel of an axle. All constant or slowly changing differences in rotary motion can be compensated for in this manner.

Some road surfaces may be less even than others. To accommodate uneven road surfaces, the processing circuitry may be arranged to adjust a degree of low pass filtering in dependence of the road surface roughness, such that more filtering is applied when the road surface is rough compared to when it is smooth. The road surface roughness can be determined based on the output from one or more IMUs 240, e.g., as a root-mean-squared (RMS) value of measured acceleration, which will be indicative of vibration experienced by the wheels on the vehicle 100. A suitable degree of low-pass filtering (a suitable filtering bandwidth) for a given surface roughness can be determined from practical experimentation, laboratory experimentation, or from computer simulation.

According to some aspects, the processing circuitry is configured to determine a road surface roughness, e.g., using an IMU, and to discard a detected tyre explosion in case the road surface roughness does not satisfy a predetermined roughness acceptance criterion.

The deviation in motion by the vehicle 100 from a straight path may comprises any of yaw motion $\omega_z$, yaw motion rate $\dot{\omega}_z$, and/or steering angle $\delta$ if the axle is a steered front or rear axle. A vehicle model, such as a two-track model or the like, describing an expected motion by the vehicle in response to actuator commands and the like can be maintained and expected wheel speeds can be extracted from this model and used to compensate the difference in measured rotary motion by the wheels. The deviation in motion by the vehicle 100 from a straight path may also be obtained from a vehicle state estimation function comprised in the VMM function, as will be discussed in more detail below. Models of vehicle dynamics which can be used for this purpose are well known in the art and will therefore not be discussed in more detail herein.

The processing circuitry may, for instance, be configured to receive acceleration data from one or more IMUs 240, and/or steering angle data from a steering angle data source 230, as discussed above. This data is indicative of a deviation in motion by the vehicle 100 from a straight path.

The processing circuitry may also be configured to determine a wheel motion oscillation based on the wheel rotation data, and to detect tyre explosion in case the compensated difference in rotary motion $\Delta\omega$, $\Delta\dot{\omega}$ and/or the wheel motion oscillation does not satisfy predetermined acceptance criteria. It has been observed that a wheel having suffered tyre explosion will give rise to oscillations in rotary motion. This will be discussed in more detail below in connection to FIG. 5C, where an example of such wheel rotary motion is illustrated. The oscillation is due to that the wheel becomes uneven after a tyre explosion and engages the road surface differently over a rotation by the wheel. This uneven engagement with the road surface is often periodic in nature, and therefore gives rise to oscillation in the rotary motion by the wheel. Wheel motion oscillation can be determined using various methods. A preferred method is to count the time between each peak of the differential wheel speed (with or without compensation). Then, by inverting the average time between the peaks, the frequency in the time domain of the wheel oscillation is obtained in an approximate manner. Along with this, it is possible to compute a model-based wheel frequency based on an assumption of one impact per complete wheel revolution. A Fourier transform of the wheel speed data, or wheel speed difference data, can also be used to determine wheel motion oscillation. Wheel motion oscillation may comprise oscillation peaks, distribution of the frequency content in the wheel speed data, or the like.

The processing circuitry is optionally also configured to determine which wheel on the considered axle F, R1, R2, T1, T2, T3 that has suffered a tyre explosion based on the wheel motion oscillation of the wheels on the axle. A higher wheel motion oscillation is indicative of tyre explosion. Hence, if tyre explosion is detected on a given axle, the oscillation behavior of the wheels on the axle can be considered. The wheel having the strongest oscillation behavior can then be identified and labelled as the wheel having suffered tyre explosion. Of course, in rare events both tyres of an axle explode more or less simultaneously. In such cases the wheel identification method may declare that both wheels have suffered an explosion, by comparing the oscillation behavior to some form of detection criteria. The computer system may, for example, determine the principal frequency component of the wheel oscillation from a Fourier transform of the compensated wheel rotary motion difference data, and check to see if the frequency and magnitude of this principal component is indicative of tyre explosion.

A unified tyre explosion detector may be designed which takes wheel speed, wheel acceleration, and wheel oscillation into account. A tyre explosion is then declared if a test statistic determined from a combination of the different data sources fails to meet an acceptance criterion. For instance, suppose that $T_\omega$ is a test statistic based on compensated wheel speed difference, $T_{\dot{\omega}}$ is a test statistic based on compensated wheel acceleration difference, and Tr is a test statistic based on oscillation in the rotary motion of a wheel, then a tyre explosion can be detected in case the test statistic $$T = w_\omega T_\omega + w_{\dot{\omega}} T_{\dot{\omega}} + w_f T_f$$

where $w_\omega$, $w_{\dot{\omega}}$, $w_f$ are predetermined weights, optionally having unit sum, fails to meet an acceptance criterion, such as a predetermined threshold or predetermined statistical test. A tyre explosion can be detected with a given level of confidence. For instance, if the test statistic $T>T_{h1}$ then a tyre explosion is possible. If the test statistic $T>T_{h2}$ then a tyre explosion is likely, while if $T>T_{h3}$ then a tyre explosion has definitely occurred. The thresholds h1<h2<h3 can be predetermined values determined from practical experimentation of computer simulation. In some cases, there may be a small difference in the timing between the different test statistics $T_\omega$, $T_{\dot\omega}$ and $T_f$. To allow for such onset deviation, a sample and hold function can be added, which keeps a high value of the test statistic for some time. An example of such a function is a rate limiter filter. Another example is a function which outputs the highest value seen over a time window, such as the highest value seen for a test statistic over the last 0.1 seconds or so.

An example derivation of the above tyre explosion detection method will now be given. To monitor differences in rotary motion between the front left wheel 101L and the front right wheel 101R a kinematic motion model associated with the vehicle 100 can be used. With reference to FIG. 2, and neglecting lateral speed of the left front tyre, the translational hub speed $v_{wxFL}$ is expressed as a longitudinal speed $v_{cxFL}$ in the front left corner of the vehicle $$v_{cxFL} = v_{wxFL}\cos(\delta_l)$$

where $\delta_l$ is the front left wheel steering angle. In most cases $\delta_l \approx \delta_r$, in which case a single steering angle value $\delta$ can be used for both front wheels of the vehicle 100. A single steering angle value will be used from now on, to simplify the developments. Taking a vehicle rotation in the horizontal plane into account, the longitudinal corner speed is expressed as $$v_{cxFL} = v_x - \frac{w}{2}\omega_z$$

Where $\omega_z$ is the yaw motion of the vehicle and w is the vehicle (front) trackwidth, as indicated in FIG. 2. The longitudinal speed of the vehicle at the center of gravity is denoted $v_x$. Using the above relationships, the vehicle speed at the center of gravity, corrected for steering angle $\delta$ and yaw motion $\omega_z$, is given by $$v_x = v_{wxFL}\cos(\delta) + \frac{w}{2}\omega_z$$

In a similar way, the speed of the front right wheel can be expressed as a function of the speed of the vehicle at the center of gravity $$v_{wxFR} = \frac{v_{cxFR}}{\cos(\delta)} = \frac{v_x + \frac{w}{2}\omega_z}{\cos(\delta)}$$

The front right wheel speed $v_{wxFR}$ can now be expressed as a function of the front left wheel speed $v_{wxFL}$.

$$v_{wxFR} = \frac{v_x + \frac{w}{2}\omega_z}{\cos(\delta)} = \frac{\left(v_{wxFL}\cos(\delta) + \frac{w}{2}\omega_z\right) + \frac{w}{2}\omega_z}{\cos(\delta)} = v_{wxFL} + \frac{w\cdot\omega_z}{\cos(\delta)}$$

The relations between the translational hub speeds and the tyre angular speeds are $$v_{wxFR} = r_{wFR}\omega_{FR}(1 - s_{xFR})$$
$$v_{wxFL} = r_{wFL}\omega_{FL}(1 - s_{xFL})$$

where $r_{WFR}$, $r_{WFL}$ are tyre effective radii, $\omega_{FR}$, $\omega_{FL}$ are the angular wheel speeds, and $s_{xFR}$, $s_{xFL}$ are the tyre longitudinal wheel slips. When wheel slips and tyre radii are the same for the two tyres, then the difference of the angular wheel speeds is manifested such as $$\omega_{FR} = \omega_{FL} + \frac{w\cdot\omega_z}{\cos(\delta)}$$

This expression relates the rotary motion of the front left wheel to the rotary motion of the front right wheel, for a given road-to-wheel steering angle $\delta$ and yaw motion $\omega_z$ under the condition that wheel slips and effective tyre radii are the same or at least similar.

Now, assume that the front right tyre explodes. In this situation the tyre will be exposed to severe disturbances. Both the tyre radius and the wheel slip of the exploded tyre will most likely be rapidly changed and different from the unaffected left tyre. Hence, if the left wheel rotary motion is used to estimate the expected right wheel rotary motion, $$\hat\omega_{FR} = \omega_{FL} + \frac{w\cdot\omega_z}{\cos(\delta)}$$

A difference in rotary motion between the first wheel rotary motion and the second wheel rotary motion can, for instance, be quantified as $$\Delta\omega = \omega_{FR} - \hat\omega_{FR} = \omega_{FR} - \left(\omega_{FL} + \frac{w\cdot\omega_z}{\cos(\delta)}\right)$$

In case the axle is not steered, then the steering angle $\delta$ is set to zero.

Figure 5A:
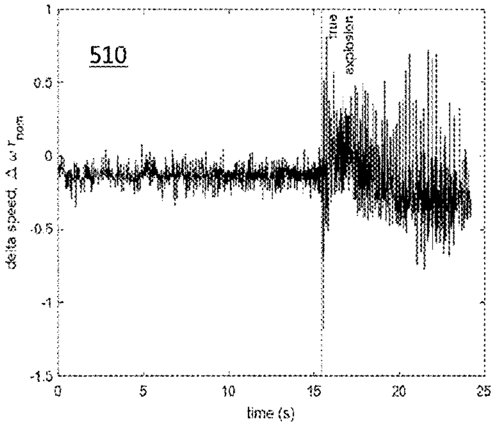
FIGS. 5A-C are graphs illustrating detection signals during a tyre explosion event.

FIG. 5A shows a times series of the residual angular wheel speed evolves during an explosion. From the figure, it is evident the amplitude changes after the explosion. The magnitude of this signal can therefore be used for tyre explosion detection.

Figure 5B:
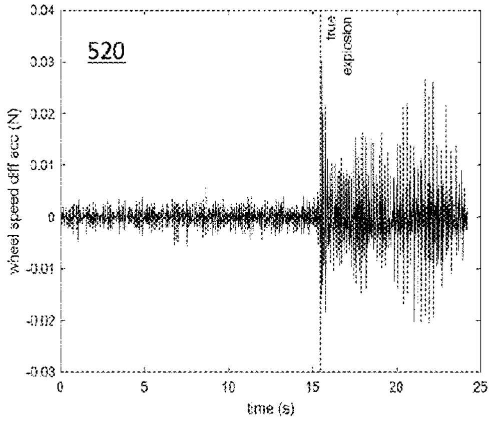

A large differential wheel acceleration indicates an influence of an external force or that the tyre radius changes quickly. The entity is computed by taking the time derivative of $\Delta\omega$ to get $\Delta\dot\omega$. This signal is exemplified in FIG. 5B. From the plots 510, 520 in FIG. 5A and in FIG. 5B it is evident that following the tyre explosion:

The magnitude of wheel speed difference increases

The magnitude of the wheel speed differential acceleration increases

The differential wheel speed oscillates with large amplitude and high frequency

Figure 5C:
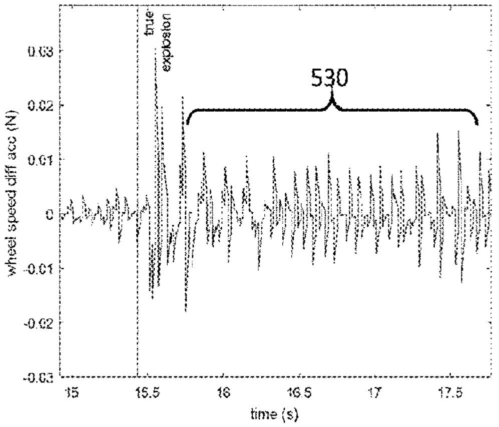

FIG. 5C illustrates a characteristics oscillation behavior 530 due to tyre explosion.

Figure 3:
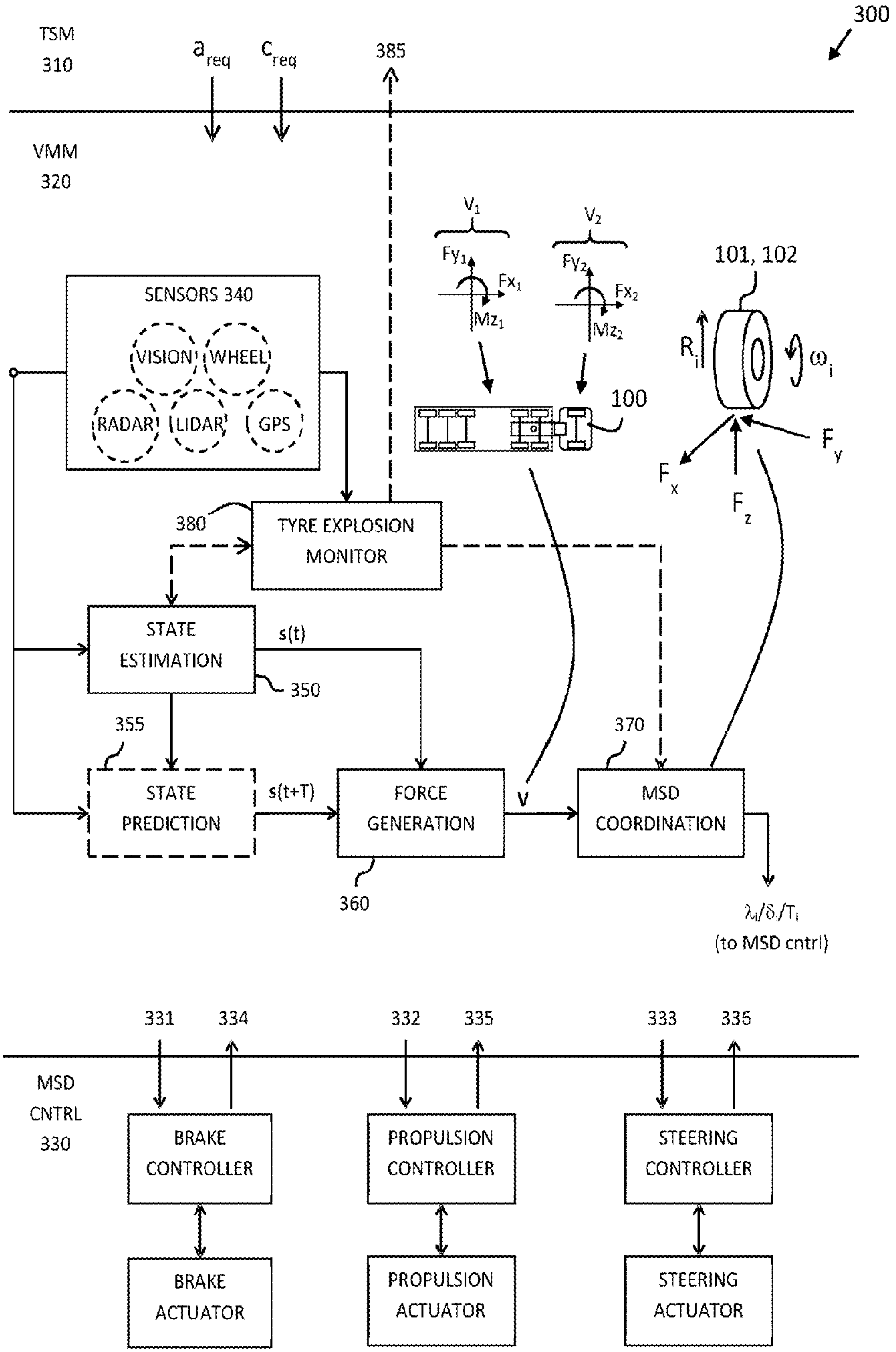

FIG. 3 schematically illustrates functionality 300 for controlling the vehicle 100 by some example motion support devices (MSD) here comprising brake actuators, propulsion actuators, and power steering, with respective controllers collectively referred to in FIG. 3 as MSD control 330. A traffic situation management (TSM) function 310 plans driving operation with a time horizon of 10 seconds or so. This time frame corresponds to, e.g., the time it takes for the vehicle 100 to negotiate a curve or the like. The vehicle maneuvers, planned and executed by the TSM function 310, can be associated with acceleration profiles $a_{req}$ and curvature profiles $c_{req}$ which describe a desired target vehicle velocity in the vehicle forward direction and turning to be maintained for a given maneuver. The TSM function continuously requests the desired acceleration profiles $a_{req}$ and steering angles (or curvature profiles $c_{req}$) from the VMM system 320 which performs force allocation to meet the requests from the TSM function in a safe and robust manner. The VMM system 320 operates on a timescale of below one second or so and will be discussed in more detail below.

Each wheel 102 on the vehicle has a longitudinal velocity component $v_x$ and a lateral velocity component $v_y$ (in the coordinate system of the wheel or in the coordinate system of the vehicle, depending on implementation). There is a longitudinal wheel force $F_x$ and a lateral wheel force $F_y$, and also a normal force $F_z$ acting on the wheel (not shown in FIG. 3). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The i-th wheel 101, 102 on the vehicle 100 has a rotational velocity $\omega_i$, and a tyre radius $R_i$. The tyre radius may be specified in terms of an effective rolling radius of the wheel.

With continued reference to FIG. 3, the TSM function 310 generates vehicle motion requests which may comprise a desired curvature $c_{req}$ to be followed by the vehicle, and desired vehicle unit accelerations $a_{req}$. Given the discussion above, it is appreciated that the motion request will have an impact on the expected nominal difference in tyre rotary motion.

The VMM system 320 operates with a time horizon of about 1 second or so, and continuously transforms the acceleration profiles $a_{req}$ and curvature profiles $c_{req}$ from the TSM function 310 into control commands 331, 332, 333 for controlling vehicle motion functions, actuated by the different MSDs of the vehicle 100 which report back capabilities 334, 335, 336 to the VMM function 320, which in turn may be used as constraints in the vehicle control. The VMM system 320 performs vehicle state or motion estimation 350, i.e., the VMM system 320 continuously determines a vehicle state s as function of time t comprising positions, speeds, accelerations, and articulation angles of the different units in the vehicle combination by monitoring operations using various sensors 340 arranged on the vehicle 100, often but not always in connection to the MSDs. An important input to the state estimation 350 may of course be the signals from the vehicle speed sensor and the wheel speed sensors on the heavy-duty vehicle 100. The vehicle state at a future time instant can also be predicted by a state prediction function 355. This vehicle state prediction function may be realized by a vehicle model having a vehicle state which can be extrapolated into a predicted vehicle state, given a current vehicle state, and optionally also given the current vehicle motion request. The state estimation function 350 may be used to determine the deviation in motion by the vehicle 100 from a straight path, used by the tyre explosion monitor 380.

The result of the state estimation 350 and optionally also the state prediction 355, i.e., the estimated vehicle state s at one or more time instants, is input to a force generation module 360 which determines the required global forces $V=[V_1, V_2]$ for the different vehicle units to cause the vehicle 100 to move according to the requested acceleration and curvature profiles $a_{req}$, $c_{req}$, and to behave according to the desired vehicle behavior. This example has two vehicle units. More vehicle units are possible, and also a single vehicle unit, e.g., in case the vehicle is a rigid truck or a passenger car. The required global force vector V is input to an MSD coordination function 370 which allocates wheel forces and coordinates other MSDs such as steering and suspension. The MSD coordination function outputs an MSD control allocation for the i:th wheel, which may comprise any of a torque $T_i$, a longitudinal wheel slip 2*i*, a wheel rotational speed @i, and/or a wheel steering angle $\delta_i$. The coordinated MSDs then together provide the desired lateral Fy and longitudinal Fx forces on the vehicle units, as well as the required moments Mz, to obtain the desired motion by the vehicle combination 100. Thus, according to some aspects of the present disclosure, the VMM system 320 manages both force generation and MSD coordination, i.e., it determines what forces that are required at the vehicle units in order to fulfil the requests from the TSM function 310, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels. The forces are determined such as to generate the vehicle behavior which is expected by the TSM function in response to the control inputs generated by the TSM function 310.

A tyre explosion monitor 380 according to the teachings herein is comprised in the VMM function 320. The tyre explosion monitor receives sensor data from the sensors 340 and performs the above discussed methods for detecting tyre explosion based at least on a compensated difference in rotary motion $\Delta\omega$, $\Delta\dot{\omega}$. The output of the tyre explosion monitor 380 may be sent to the state estimation function 350 and/or to the state prediction function 355, where it can be used to adjust the estimated vehicle state to account for the tyre explosion. A certain yaw motion may, e.g., be expected from the tyre explosion. The output from the tyre explosion monitor 380 may also be useful at the MSD coordination function 370, since a wheel associated with tyre explosion will have a reduced capability of generating wheel force. Hence, wheel forces should not be assigned to a wheel having an exploded tyre. The output of the tyre explosion monitor 380 may also be sent directly to one or more MSD controllers, bypassing higher layer controls. The MSD controller may respond faster to a detected tyre explosion, similar to when the human brain is bypassed if a hand is burned on the stove, to more quickly remove the hand from the heat source.

The techniques for tyre explosion detection discussed herein may, generally, be applied in a number of vehicle control functions. For instance, the processing circuitry executing the tyre explosion detection routines may also be configured to adjust vehicle motion in response to detecting a tyre explosion, to lower vehicle speed in response to detecting a tyre explosion, and/or to adjust an admissible steering torque of the vehicle 100 in response to detecting a tyre explosion. The processing circuitry may also be configured to trigger generation of a warning signal 385 to a driver of the vehicle 100 in response to detecting a tyre explosion, as well as to trigger generation of a notification message 385 to an autonomous drive system of the vehicle 100 in response to detecting a tyre explosion. The processing circuitry is optionally also configured to activate a corrective steering function and/or an oversteer guidance system of the vehicle 100 in response to detecting a tyre explosion.

Figure 4:
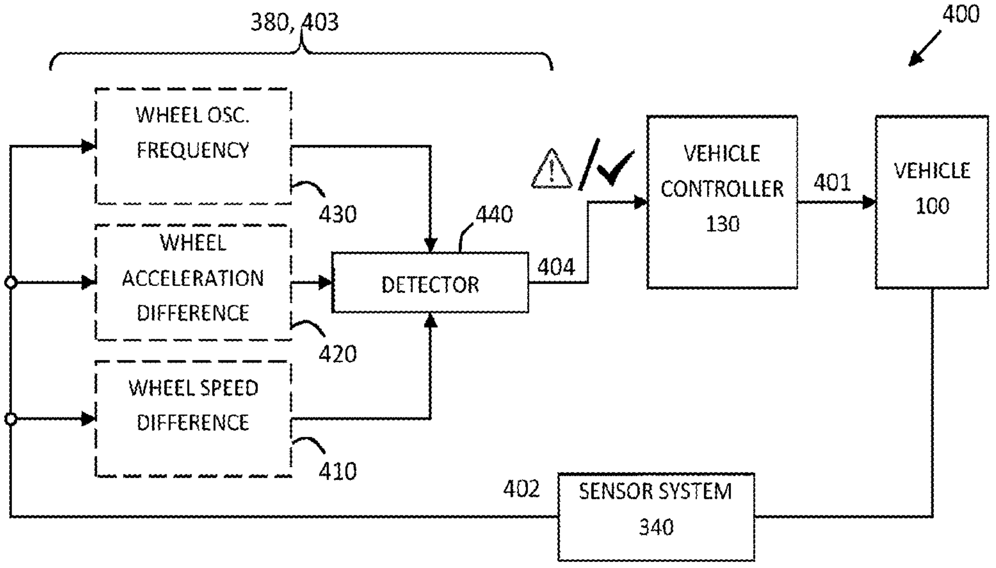

FIG. 4 provides a schematic overview 400 of the herein proposed tyre explosion detector. A vehicle controller 130 controls the vehicle 100 by sending control signals 401 to control, e.g., wheel forces as discussed above. A sensor system 340 monitors vehicle behavior, and outputs sensor signals 402 to the tyre explosion detector system 403. The tyre explosion detector system 403 consists of a number of optional modules, where each module is arranged to determine a difference in rotary motion between the first wheel rotary motion and the second wheel rotary motion. A wheel speed difference module 410 is arranged to determine a wheel speed difference $\Delta\omega$. A wheel acceleration difference module 420 is arranged to determine a wheel acceleration difference $\omega\dot{\omega}$. A wheel oscillation frequency computation module 430 is arranged to determine a wheel motion oscillation. The outputs from the respective modules are sent to a detector module 440, which performs a test on the signals from the modules 410, 420, 430 to determine if a compensated difference in rotary motion satisfies a predetermined acceptance criterion or not. The result of this test is forwarded to the vehicle controller 130 as a tyre explosion detection signal 404.

Figure 6:
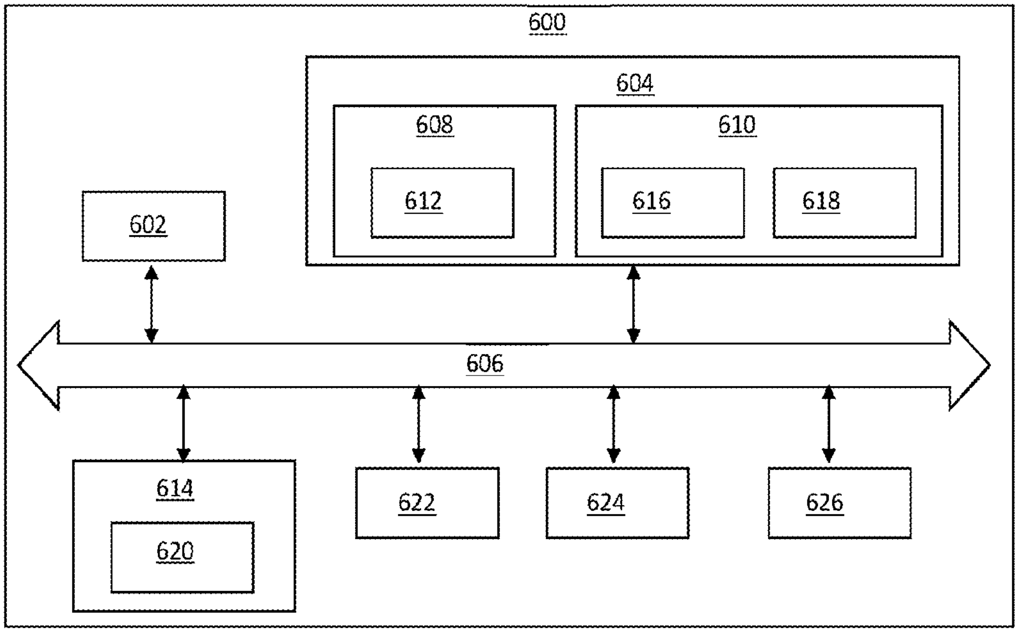
FIG. 6 is a schematic diagram of an exemplary computer system.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

Figure 7:
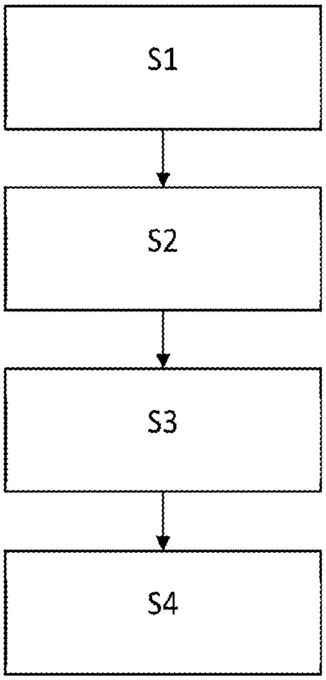
FIG. 7 is a flow chart illustrating methods.

FIG. 7 is a flow chart illustrating methods that correspond to the different technical features of the computer system and the vehicles discussed herein. The flow chart illustrates a computer-implemented method for detecting tyre explosion in a heavy-duty vehicle 100. The method comprises obtaining S1, by processing circuitry of a computer system, wheel rotation data indicative of a first wheel rotary motion $\omega_1$, $\dot{\omega}_1$ and of a second wheel rotary motion $\omega_2$, $\dot{\omega}_2$, for first and second wheels 101L, 101R, 102, 103 of an axle F, R1, R2, T1, T2, T3 on the vehicle 100. The method also comprises determining S2, by the processing circuitry, a difference $\Delta\omega$, $\Delta\dot{\omega}$ in rotary motion between the first wheel rotary motion $\omega_1$, $\dot{\omega}_1$ and the second wheel rotary motion $\omega_2$, $\dot{\omega}_2$, as well as compensating S3, by the processing circuitry, the difference in rotary motion $\Delta\omega$, $\Delta\dot{\omega}$ for a deviation in motion by the vehicle 100 from a straight path. The method also comprises detecting S4, by the processing circuitry, tyre explosion in case the compensated difference in rotary motion $\Delta\omega$, $\Delta\dot{\omega}$ does not satisfy a predetermined acceptance criterion.

Figure 8:
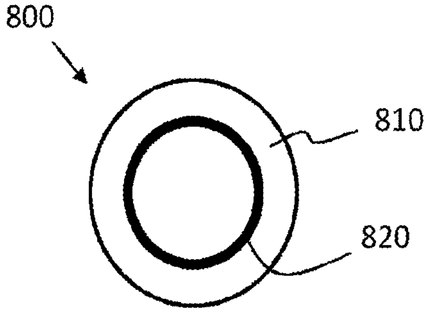
FIG. 8 shows an example computer program product.

FIG. 8 illustrates a computer readable medium 810 carrying a computer program comprising program code means 820 for performing the methods illustrated in FIG. 7 and the techniques discussed herein, when said program product is run on a computer. The computer readable medium and the code means may together form a computer program product 800.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer system for detecting tyre explosion in a heavy-duty vehicle, the computer system comprising processing circuitry configured to:

obtain wheel rotation data indicative of a first wheel rotary motion and of a second wheel rotary motion, for first and second wheels of an axle on the vehicle, determine a difference in rotary motion between the first wheel rotary motion and the second wheel rotary motion, compensate the difference in rotary motion for a deviation in motion by the vehicle from a straight path, and detect tyre explosion in case the compensated difference in rotary motion does not satisfy a predetermined acceptance criterion.

2. The computer system of claim 1, where the first wheel rotary motion and the second wheel rotary motion, comprises wheel speed and/or wheel acceleration.

3. The computer system of claim 1, where the deviation in motion by the vehicle from a straight path comprises any of; yaw motion and yaw motion rate.

4. The computer system of claim 1, where the axle is a steered axle on the vehicle and where the deviation in motion by the vehicle from a straight path comprises a steering angle applied at the steered axle.

5. The computer system of claim 1, where the processing circuitry is configured to receive acceleration data from one or more inertial measurement units, IMU, and/or steering angle data from a steering angle data source, indicative of a deviation in motion by the vehicle from a straight path.

6. The computer system of claim 1, where the processing circuitry is configured to determine a wheel motion oscillation based on the wheel rotation data, and to detect tyre explosion in case the compensated difference in rotary motion and/or the wheel motion oscillation does not satisfy predetermined acceptance criteria.

7. The computer system of claim 6, where the processing circuitry is configured to determine which wheel on the axle that has suffered a tyre explosion based on the wheel motion oscillation of the wheels on the axle.

8. The computer system of claim 1, where the processing circuitry is configured to verify a detected tyre explosion after a time period.

9. The computer system of claim 1, where the processing circuitry is configured to compensate the difference in rotary motion for a difference in tyre radius on the left side and the right side on the axle.

10. The computer system of claim 1, where the processing circuitry is configured to adjust vehicle motion in response to detecting a tyre explosion.

11. The computer system of claim 1, where the processing circuitry is configured to lower vehicle speed in response to detecting a tyre explosion.

12. The computer system of claim 1, where the processing circuitry is configured to adjust an admissible steering torque of the vehicle in response to detecting a tyre explosion.

13. The computer system of claim 1, where the processing circuitry is configured to trigger generation of a warning signal to a driver of the vehicle in response to detecting a tyre explosion.

14. The computer system of claim 1, where the processing circuitry is configured to trigger generation of a notification message to an autonomous drive system of the vehiclein response to detecting a tyre explosion.

15. The computer system of claim 1, where the processing circuitry is configured to activate a corrective steering function and/or an oversteer guidance system of the vehiclein response to detecting a tyre explosion.

16. The computer system of claim 1, where the processing circuitry is configured to determine a road surface roughness, and to discard a detected tyre explosion in case the road surface roughness does not satisfy a predetermined roughness acceptance criterion.

17. A vehicle comprising the computer system of claim 1.

18. A computer-implemented method for detecting tyre explosion in a heavy-duty vehicle, the method comprising:

obtaining, by processing circuitry of a computer system, wheel rotation data indicative of a first wheel rotary motion, and of a second wheel rotary motion, for first and second wheels of an axle on the vehicle, determining, by the processing circuitry, a difference in rotary motion between the first wheel rotary motion and the second wheel rotary motion, compensating, by the processing circuitry, the difference in rotary motion for a deviation in motion by the vehicle from a straight path, and detecting, by the processing circuitry, tyre explosion in case the compensated difference in rotary motion does not satisfy a predetermined acceptance criterion.

19. A computer program product comprising program code for performing, when executed by the processing circuitry, the method of claim 18.

20. A non-transitory computer-readable storage medium comprising instructions, which when executed by processing circuitry, cause the processing circuitry to perform the method of claim 18.

* * * * *